Nov. 17, 1931.  J. B. ANDERSON  1,831,799
GAS HEATED SOLDERING IRON
Filed Nov. 26, 1929
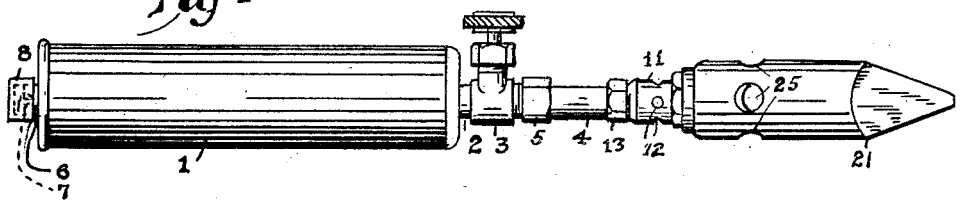
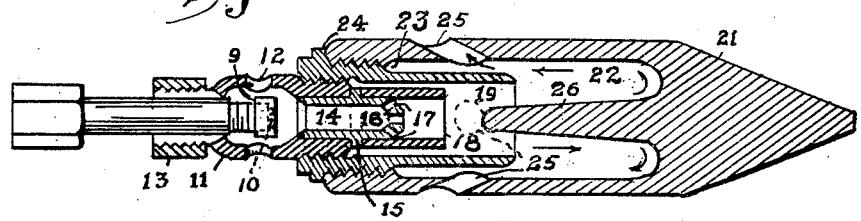
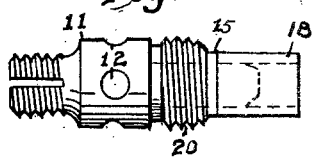
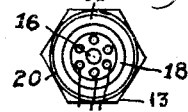
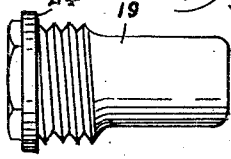
INVENTOR
James B. Anderson
by Edward A. Lawrence
his attorney Patented Nov. 17, 1931

1,831,799

UNITED STATES PATENT OFFICE

JAMES B. ANDERSON, OF SHALER TOWNSHIP, ALLEGHENY COUNTY, PENNSYLVANIA

GAS-HEATED SOLDERING IRON

Application filed November 26, 1929. Serial No. 409,777.

The object which I have in view is the provision of a soldering iron which will be convenient to handle and use, which will quickly become heated to the necessary temperature, which may be conveniently lighted and which will not blow out.

My improved soldering iron is characterized by the provision of a cavitated soldering head which is mounted, preferably detachably as by screw engagement, on a gas-burner assembly, the flames from said burner being discharged into the cavity of the soldering head and being reverberated against the walls of the cavity and rearwardly therein to escape through ports in the side wall of the soldering head in the rear of the discharge end of the burner.

Another characteristic feature of my improved soldering iron is the provision of means within the cavity of the soldering head to divide the flames and cause them to be reverberated rearwardly into contact with the wall of the cavity, thus expediting the heating of the metal of the head.

The escape ports in the soldering head for the flames are caused to diverge rearwardly, thus preventing any chance of the flames blowing out and greatly facilitating the lighting of the gas in the soldering head.

Another characteristic and novel feature of the soldering iron is the provision of a small cylindrical gas-tank which forms the handle of the soldering iron.

Other novel features of construction, and also of arrangement of parts will appear from the following description.

In the accompanying drawings, wherein I have illustrated a practical embodiment of the principles of my invention, Fig. 1 is a side elevation of the soldering iron.

Fig. 2 is an enlarged longitudinal section of the soldering head and the gas burner.

Fig. 3 is a side elevation of the burner assembly.

Fig. 4 is an end view of the same.

Fig. 5 is a side elevation of the flame-director tube.

Referring to the drawings, 1 represents a storage tank in which the fuel for the gaseous flame is stored and from which such fuel is supplied under tank pressure to the gas-burner. The fuel is preferably hydrocarbon liquid gas.

One end of the tube has fixed in its central port a nipple 2 to which is attached a valve 3. When the soldering iron is assembled with the tank a tube 4 is coupled to the valve as by means of the coupler 5.

The tank may be detached from the tube 4 and the coupler 5 connected to a supply tube leading from a bottle or other source of supply of liquid gas, for filling or refilling the tank. To enable the tank to be filled with the liquid gas, a second nipple 6 is screwed or fixed in a port in the other or rear end of the tank, the wall of the nipple being provided with a small bleeder port 7 and a screw cap 8 being screwed on the nipple, so that the port 7 may be opened to permit the escape of air in filling the tank with gas and may be closed by screwing up the cap when the tank has been filled.

The tank is preferably of cylindrical shape and of the proper diameter and length as to form the handle of the soldering iron, as illustrated in Fig. 1.

The other or front end of the tube 4 is provided with a small escape port for producing a jet of gas. Thus the end of the tube may be threaded and have screwed thereon a cap 9 having a jet port 10 in its center.

11 represents the tubular mixer member with its rear end in the form of a reduced neck having a sliding fit on the tube 4 while its intermediate portion, which is of larger diameter surrounds the front end of the tube 4 and the cap 9 and forms the mixing chamber.

The intermediate portion of the mixer 11 is provided with a circumferentially arranged series of ports 12 for the admission of air into the mixing chamber, the proportion of air to gas being regulated by sliding the member 11 along the tube 4. To enable the member to be fixed relative to the tube and thereby maintain a desired mixture of air and gas, the neck of the member 11 is split and threaded, and a nut 13 may be screwed up on the split neck to clamp it to the tube 4.

14 represents a nozzle thimble which is mounted on the front end of the mixer 11. Thus the rear end of the thimble may be inserted into the mixer, the degree of insertion being limited by the circumferential collar 15 on the thimble, and the thimble being held in place in any convenient manner as by having a drive fit in the mixer. The rear or inner end of the bore of the thimble is preferably flared to reduce the frictional resistance to the travel of the feed mixture.

It is preferable to give the intermediate portion of the mixer 11, that having the air ports 12, a somewhat larger internal diameter than the front portion of the mixer, thus providing a relatively large mixing chamber and facilitating the entrance and the mixing of the air with the gas.

At its front or outer end the wall of the thimble is drawn in or contracted to form a reduced central nozzle opening 16 and the converging wall of said opening is provided with an annularly arranged series of smaller ports 17 which diverge outwardly as shown in Fig. 2.

18 represents a tubular flame shield extending forwardly from the thimble 14. Thus said shield may be driven on the thimble against the shoulder 15.

The shield extends forwardly of the nozzle opening and thus the jets of flame from small ports 17 strike the wall of the shield 18 and are reverberated into combination with the central jet from the port 17.

19 represents a flame-director tube extending forwardly beyond the shield 18 and of somewhat larger diameter. The tube 19 may be mounted in place by having its rear end provided with internal threads which are screwed onto the threaded portion 20 of the mixer 11.

The soldering head 21 is cast of suitable metal, such as copper, and its front or tapered end is solid while a bore or cavity 22 extends inwardly from its rear end, and the flame-director 19 extends into said bore, an annular chamber 23 being formed between the exterior of the flame-director and the inner wall of the head.

The head is removably mounted in place. Thus I have shown the outer end of the bore provided with screw threads which are screwed onto external threads on the rear end of the director 19, the end of the head being screwed up against a circumferential shoulder 24 on the director. Thus the rear end of the annular chamber 23 is closed while its front end is open to the bore of the head.

In the rear of the front end of the director 19 the wall of the bore of the head is provided with an annular series of ports 25 for the escape to the atmosphere of the products of combustion, said ports diverging rearwardly as shown in Figs. 1 and 2.

26 represents a stem which is preferably integral with the material of the head, and which extends rearwardly from the solid front end of the latter to a point within the front end of the flame director 19.

This stem is tapered rearwardly from its front end or base and serves to divide the flames from the burner entering the bore of the head and to cause them to be reverberated against the front end and the side walls of the bore, and to travel rearwardly in close contact with the side walls, the products of combustion flowing rearwardly into the annular chamber 23 and escaping through the ports 25. The stem also conducts the heat which it received from the flames to the solid point of the head, thus greatly facilitating the heating of the working portion of the soldering head.

At the front or inner end of the bore the wall surfaces are curved, as shown in Fig. 2, thus avoiding corners or pockets and assisting in the reverberation of the flames.

If the valve 3 and the mixer are regulated to admit the proper fuel mixture at proper pressure to the burner nozzle the soldering head will be quickly heated and the products of combustion without flames will escape from the ports 25. The rearward divergence of the ports prevents the flames blowing out.

The torch may be lighted by first turning on the gas and then holding a lighted match to one of the ports 25.

My improved soldering iron is of inexpensive yet very durable construction. It is convenient to handle and is easy to transport from one job to another. It is entirely safe and most efficient in operation.

What I desire to claim is:—

1. In a gas-heated soldering iron, the combination of a burner, a tubular flame director having an imperforate wall extending forwardly from the burner, a soldering head mounted in front of the burner and having a bore which extends rearwardly over the flame director, means comprising ports in the wall of the soldering head for the escape of the burnt gas from said bore in the rear of the front end of the flame director, and a stem extending from the inner end of the bore toward the flame director.

2. In a gas-heated soldering iron, the combination of a burner, a tubular flame director having an imperforate wall extending forwardly from the burner, a soldering head mounted in front of the burner and having a bore which extends rearwardly over the flame director, means comprising ports in the wall of the soldering head for the escape of the burnt gas from said bore in the rear of the front end of the flame director, and a stem extending from the inner end of the bore into the front end of the flame director.

3. In a gas-heated soldering iron, the combination of a burner, a tubular flame director having an imperforate wall extending forwardly from the burner, a soldering head mounted in front of the burner and having a bore which extends rearwardly over the flame director, means comprising ports in the wall of the soldering head for the escape of the burnt gas from said bore in the rear of the front end of the flame director, and a stem extending from the inner end of the bore, said stem being integral with the material of the soldering head.

4. In a gas-heated soldering iron, the combination of a burner, a tubular flame director having an imperforate wall extending forwardly from the burner, a soldering head mounted in front of the burner and having a bore which extends rearwardly over the flame director, means comprising ports in the wall of the soldering head for the escape of the burnt gas from said bore in the rear of the front end of the flame director, and a stem extending from the inner end of the bore into the front end of the flame director, said stem being integral with the material of the soldering head.

Signed at Pittsburgh, Pa., this 25th day of November, 1929.

JAMES B. ANDERSON.